United States Patent [19]

Oustin et al.

[11] 4,180,426
[45] Dec. 25, 1979

[54] PROCESS AND APPARATUS FOR MAKING MULTIPLY SHEETS

[75] Inventors: Georges Oustin; Helmut Krumm, both of Aix-la-Chapelle, Fed. Rep. of Germany

[73] Assignee: Saint-Gobain Industries, Neuilly-sur-Seine, France

[21] Appl. No.: 487,618

[22] Filed: Jul. 11, 1974

Related U.S. Application Data

[63] Continuation of Ser. No. 10,911, Feb. 12, 1970, abandoned.

[30] Foreign Application Priority Data

Feb. 17, 1969 [FR] France .................................. 69.03831

[51] Int. Cl.² .............................................. B32B 17/04
[52] U.S. Cl. .................................... 156/104; 156/105; 156/107; 156/286; 156/382
[58] Field of Search ................. 156/99, 103, 104–107, 156/285, 286, 382

[56] References Cited

U.S. PATENT DOCUMENTS

| | | | |
|---|---|---|---|
| 1,909,444 | 5/1933 | Worrall | 156/104 |
| 2,673,822 | 3/1954 | Dennison et al. | 156/104 |
| 2,948,645 | 8/1960 | Keim | 156/104 |
| 3,027,288 | 3/1962 | Keslar | 156/104 |
| 3,307,999 | 3/1967 | Boicey | 156/104 |
| 3,347,723 | 10/1967 | Hill | 156/104 |
| 3,405,019 | 10/1968 | Seil et al. | 156/104 |
| 3,493,451 | 2/1970 | Beery | 156/286 |
| 3,553,054 | 1/1971 | Maus | 156/286 |
| 3,769,133 | 10/1973 | Halberschmidt et al. | 156/104 |
| 3,852,136 | 12/1974 | Plumat et al. | 156/103 |
| 3,917,503 | 11/1975 | Tamura et al. | 156/382 |

Primary Examiner—John E. Kittle
Attorney, Agent, or Firm—M. Richard Page; John T. Synnestvedt

[57] ABSTRACT

Multiply windows are made by assemblying an interlayer of thermoplastic adhesive between plies of the sheet, subjecting the outer surfaces of the plies and the interlayer to vacuum, and subjecting the evacuated assembly to heat and pressure sufficient to bond them together while maintaining the vacuum. Apparatus is provided for this operation which includes an autoclave, means to establish a selected temperature within the autoclave, means to establish a selected pressure within the autoclave, flexible sack means within the autoclave, means to seal the sack means about a multiply sheet, and vacuum means connected to the interior of the sack means.

1 Claim, 2 Drawing Figures

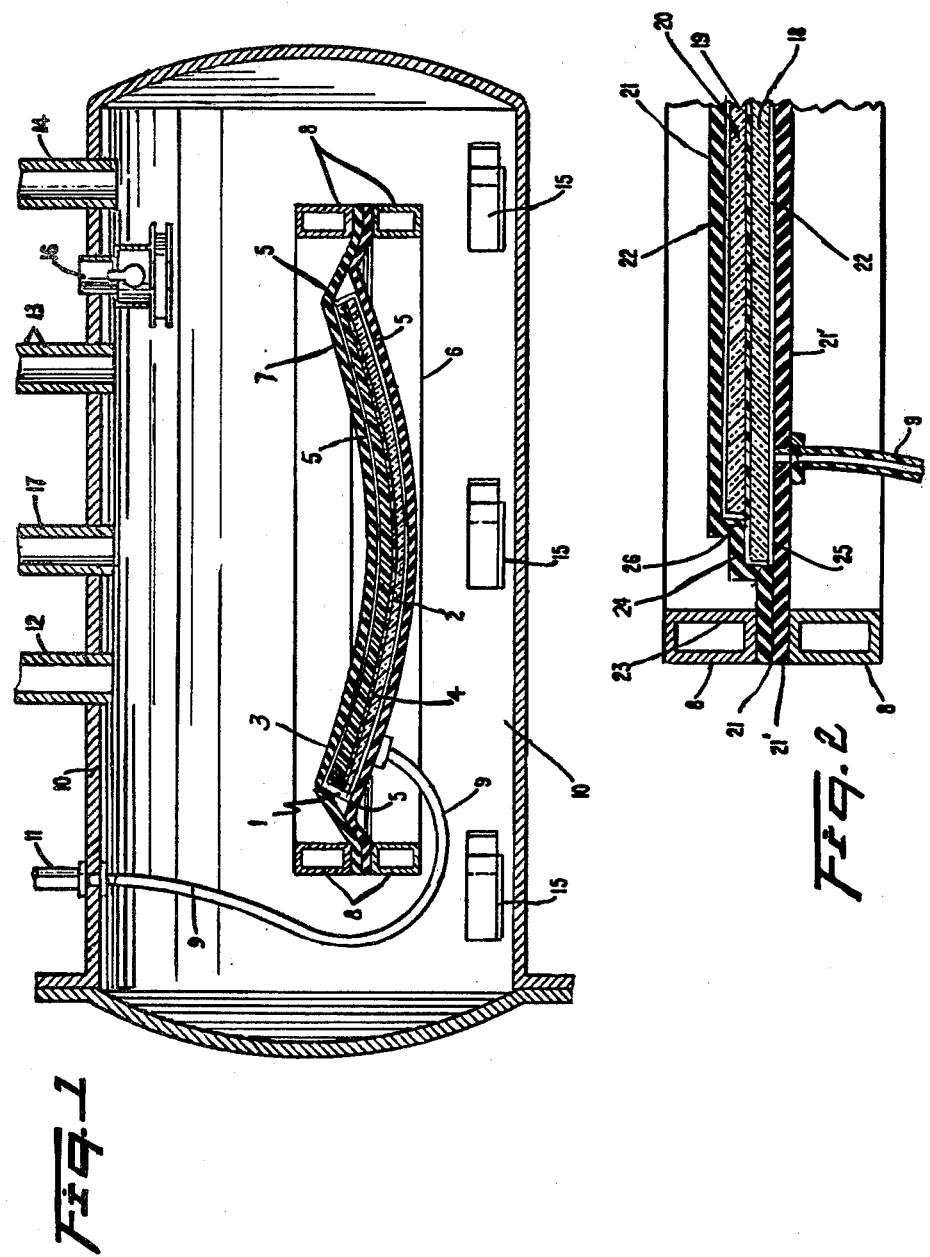

PROCESS AND APPARATUS FOR MAKING MULTIPLY SHEETS

This is a continuation, of application Ser. No. 10,911, filed Feb. 12, 1970 now abandoned.

This invention relates to the manufacture of multiply sheets composed of assemblies of plies in sheet form. Common forms of such multiply sheets are the windows of automobiles and aircraft which are made of three plies of which the outer are glass or plastic and the interlayer is a thermoplastic which becomes adhesive at sufficient temperature.

The invention is particularly concerned with improving the known processes of joining the plies, which involves the extraction of gas from between the plies and the sealing of the edges of the plies, which precedes the actual thermal adhesion and is accomplished under vacuum.

In the past the operation of forming a multiply assembly has been accomplished in two distinct operations, of which the first is a preliminary pressing to eject the air from between the plies and to close the edges of the assembly so that they will be sealed for the following operation. The second step is the attachment of the plies to one another by heat and pressure.

The preliminary pressing has been carried out by passing the assembly between rollers which exercise a certain pressure on its outsides, the assembly having been preliminarily heated to soften the plastic interlayer. Such interlayers are commonly sheets of polyvinyl butyral but they have also included many different kinds and physical states of adhesive. That method, however, has been difficult of accomplishment because of the difficulty of obtaining even distribution of pressure, especially when sheets of varying curvature have been involved. This has led to shattering of sheets in the course of the operation and to substantial losses.

It has also been attempted to accomplish the preliminary pressing of the assembly in a rubber sack, establishing a vacuum in the sack in order to degas the intermediate layer, then raising the sack and its contents to a temperature sufficient to seal the edges of the assembly. After this preliminary operation the assembly has been withdrawn from the sack and subjected to a classical treatment in an autoclave. Such a process is described in U.S. Pat. No. 3,505,160, but that method also has imperfections. In spite of the use of certain artifices in the interior construction of the sack it has been difficult to prevent the formation of air pockets in the interlayers due to the action of atmospheric pressure on the sack, which initiates the partial obstruction of the assembly and opposes the effect of the vacuum. Such pockets of air are the origins of bubbles in the completed multiply sheet. This danger is particularly large when the interlayers are relatively thick or when the whole assembly is composed wholly or partly of sheets of plastic. Such assemblies are particularly sensitive to deformation resulting from localized differences in pressure particularly at the temperatures which are employed in the operation.

It has also been attempted to enclose the assembly of outer sheets with their interlayer, fixing them in assembled position by means of clamps or other sealing means disposed around their periphery, in the autoclave where the sealing is carried out, first subjecting them to the action of vacuum then of heat. Such a process is described in British Pat. No. 755,809, but that process is particularly difficult when the assembly is composed of exterior plies of thin glass or of plastic because of local deformation resulting from the pressure of the clamps.

It is an object of the invention to overcome the foregoing imperfections and at the same time to improve the quality of the product, to increase the yield of good assemblies, and to improve the processes by which they are made. It is a particular object of the invention to improve the making of windows comprising glass of which the manufacture is particularly delicate, and to improve the process in which one or more of the outer plies is organic plastic.

It is an object of the invention to make multiply sheets by the use of heat, pressure, and vaccum upon a multiply assembly including a heat-responsive interlayer. As automobile and aircraft windows are made by such methods the particular description will be directed to the making of such windows, but without limiting the scope of the invention, which may be used to join the elements of any multiply assembly together.

A common form of windshield has two plies of glass bonded into a unit by an interlayer of plastic. Another form has a ply of thermohardening plastic and a ply of glass bonded to a thermoplastic interlayer, all layers being transparent. Another form has two sheets of plastic bonded to an interlayer of heat-responsive plastic. A typical interlayer is polyvinyl butyral.

It is also a particular object of the invention to achieve a more complete extraction of the gas from between the plies of the assembly.

The objects of the invention are accomplished generally speaking by a method of making multiply sheets which comprises assembling an interlayer of thermoplastic adhesive between plies of the sheet, subjecting the outer surfaces of the plies and the interlayer to vacuum, and subjecting the evacuated assembly to heat and pressure sufficient to bond them together while maintaining the vacuum. The objects as to apparatus have been accomplished by apparatus for the manufacture of multiply sheets which comprises an autoclave, means to establish a selected temperature within the autoclave, means to establish a selected pressure within the autoclave, flexible sack means within the autoclave, means to seal the sack means about a multiply sheet, and vacuum means connected to the interior of the sack means.

The process of the invention accomplishes the extraction of gas from the interlayers under vacuum before heat sealing by reducing the pressure on the assembly, on the one hand putting the interlayers under vacuum and on the other hand putting the exterior faces of the assembly under vacuum. In this way the risk of obstruction disappears and the assembly is subjected throughout its periphery to the same conditions of vacuum. The evacuation of the intermediate layers is materially improved because the temperature of this operation remains inferior to the bonding temperature.

It is particularly advantageous in applying the invention to control the vacuums which are established on the one hand in the accessories which establish a tight joint around the edges of the interlayer and on the other hand which are established within the enclosure external to the assembly. It is particularly desirable especially when the material or the thickness of the outer plies is easily damaged either to retard the evacuation of the intermediate layers with respect to the evacuation of the space enclosing the assembly or on the contrary to retard the evacuation of the space around the assembly with respect to the evacuation of the intermediate layers. It will be perceived, therefore, that the present process and apparatus permit the sequential application of differential pressures to the outside and the inside of the assembly or vice versa. This process and apparatus thus produces the evacuation, the sealing of the borders of the assembly, and the heat sealing under the very best conditions of pressure control. In most cases it is advantageous to equalize all pressures within the enclosure before opening it to the air. The enclosure within which the assemblies are placed for the application of the process may be an autoclave and this is particularly advantageous because it makes handling of the assemblies unnecessary until the process is completed. The evacuation of the interlayers of the assembly may be accomplished by sealing its edges by an encircling tight seal, for instance a rubber or other very flexible material which is penetrated only by the vacuum line. The same result can be obtained by placing the assembly in a tight sack penetrated by a vacuum line. In this case also the sack may be of rubber or other sufficiently flexible and impermeable materials. In certain highly advantageous forms of the invention sacks are employed which can be opened or closed by the application of pressure. Such a sack is shown in the drawings. After the evacuation has been completed the joining of the plies to the interlayer may be accomplished by any known means, for example while maintaining the vacuum on the interlayer, reestablishing normal pressure in the autoclave, then to increase temperature and pressure within the autoclave sufficiently to cause the adhesion of the plies. In certain cases it is advisable to avoid the flowing of the intermediate layer, to reestablish a pressure near that of the autoclave inside the belt or the sack which seals the interfaces. As these final operations are being carried out after evacuation, it then becomes necessary to use a temperature and pressure which are sufficient to seal the edges of the belt or the sack. In other cases there is advantage in withdrawing the assemblies from their sacks before uniting their plies. In other cases it is advantage during the process of unification to maintain a constant temperature and pressure between the internal layers and that existing in the autoclave.

The following example illustrates the invention but does not limit it:

FIG. 1 is a vertical section, diagrammatic in character, through a preferred form of the apparatus;

FIG. 2 is a vertical section through a part of a sack with its contents.

FIG. 1 represents a window assembly constituted by a glass sheet 2 and a plastic sheet 3 which are to be connected by an interlayer 4 of transparent thermoplastic adhesive. Such windows have been made from a thin layer of glass, an interlayer of polyvinyl butyral, and an outer layer of thermohardening transparent plastic. These are presumed to have been assembled in a climatized room and introduced between the layers 6 and 7 of a rubber sack. In this case the rubber sack is composed of thin sheets somewhat larger than the assembly, the edges of which are clamped between rings 8—8 with sufficient force to be sealed. The supporting means for rings 8—8 is not shown. The assembly is wrapped in gauze or flannel or some other porous fabric 5 which completely covers it without preventing the flow of air from within the interlayer and from the outer faces through the pipe 9-11 which is attached to a source of vacuum. An autoclave 10 is provided with the connection 11 for vacuum, a connection 12 for changing the atmosphere in the autoclave, a connection 13 for compressed air from a source not shown outside the autoclave, a connection 14 connected to a source of vacuum outside the autoclave, a connection 15 for the introduction of heating fluids such as for hot air, a light 16, an inspection tube 17, and with apparatus for measuring temperatures and pressure which are not shown. After the introduction of the sack containing the assembly and due connection to vacuum, the autoclave is closed and vacuum is created simultaneously inside the sack and in the autoclave. The evacuation of both enclosures is conducted so as to establish a certain advance of the evacuation of the autoclave. In this way there is established a higher pressure in the interior of the sack with respect to that in the autoclave and the two walls of the sack are not compressed upon the assembly. Because of this and because of the porosity of the felt or gauze it follows that there is ready exhaustion of the air and moisture and any volatile products which exist in the interlayer between the outer plies. The differential between the evacuation of the sack and of the autoclave can be regulated by hand by means of a valve not shown in the figure accompanied by observation through the porthole 17. The manipulation is satisfied when the walls of the sack appear to be slightly inflated. This first operation of degassing continues for several minutes to an hour according to the degree of humidity of the thermoplastic material and according to whether it has previously been climatized or not. The closing of the border of the assembly is obtained by increasing the pressure on the interior of the autoclave to a sufficient pressure, atmospheric for example, while maintaining the interior of the sack under vacuum and maintaining the temperature in the autoclave just above the softening point of the interlayer of adhesive.

Experience has shown that these conditions of pressure and temperature achieve a good sealing of the edges of the assembly without introducing optical defects in spite of the sensitivity of the plastic sheet to the deformations resulting from local pressure or the compression of the walls of the sack on the borders. A final operation, the unification, properly so called, by heat and pressure, goes forward after having withdrawn the upper sheet 7 of the sack and the porous envelope 5. In many cases it can also go forward without removing them. To remove them requires that the autoclave be opened after which it is closed again and compressed hot air is forced into the autoclave until the pressure and temperature necessary to the bonding of the interlayer to the outer layers is achieved. This requires probably a half-hour for polyvinyl butyral at 140° C. and 4-10 atmospheres. Afterward the temperature is progressively reduced to about 50° C. by the introduction of cold compressed air; the pressure finally reaches normal, and the autoclave is opened. It has been demonstrated that the assemblies thus produced are characterized by excellent adhesion and by the complete absence of gas bubbles in the intermediate layer. Furthermore, there is no optical deformation in the borders.

It is to be understood that the foregoing example is illustrative and that many variants are possible according to the nature of the plies and interlayer of the assembly and, further, depending upon their thickness and upon the use to which they are destined.

In certain particular cases the results obtained by the process are improved when the interlayer and one of the outer plies are of somewhat lesser size than the other of the outer sheets. This is shown in FIG. 2 in which an upper sheet 20 has its edge offset inward from the edge 23 of the lower sheet 18. A porous fabric 22 encloses them and a plastic interlayer 19 separates them. An upper flexible, impervious sheet 21 and a lower sheet 21' form a sack the edges of which are held together by rings 8. The vacuum line 9 passes through the lower sheet 21' and withdraws the moisture and gases from within through the porous fabric 22, which it will be observed is in contact with the interlayer. It has been discovered that there is no risk of the interlayer flowing out of position when it is at bonding temperature and pressure.

In all cases it has been demonstrated that the final products produced by this process and apparatus are superior in optical qualities, lack gaseous inclusions in the interlayer, and lack free-form distortions at their periphery even when they are accidentally subjected to excessive temperature and pressure.

As many apparently widely different embodiments of the present invention may be made without departing from the spirit and scope thereof, it is to be understood that the invention is not limited to the specific embodiments.

What is claimed is:

1. A method of making a multi-ply sheet which comprises assembling an interlayer of thermoplastic adhesive between superposed plies of the sheet to form an assembly, enclosing the assembly within a porous cover, enclosing the assembly and cover within a gas-impermeable flexible sack, enclosing the assembly-and-cover-containing sack within an evacuable container, reducing the gas pressures within said sack and said container to subatmospheric levels while maintaining the pressure level within the container less than the pressure level in the sack, thereafter increasing the temperature and pressure within said container while maintaining a subatmospheric pressure within said sack to seal the edges of said assembly, and thereafter further increasing the pressure in said container above atmospheric pressure and producing a temperature therein to bond said interlayer to the adjacent plies of said assembly.

* * * * *